W. H. MITCHELL.
BRAKE.
APPLICATION FILED OCT. 24, 1907.
901,633.
Patented Oct. 20, 1908.
3 SHEETS—SHEET 1.
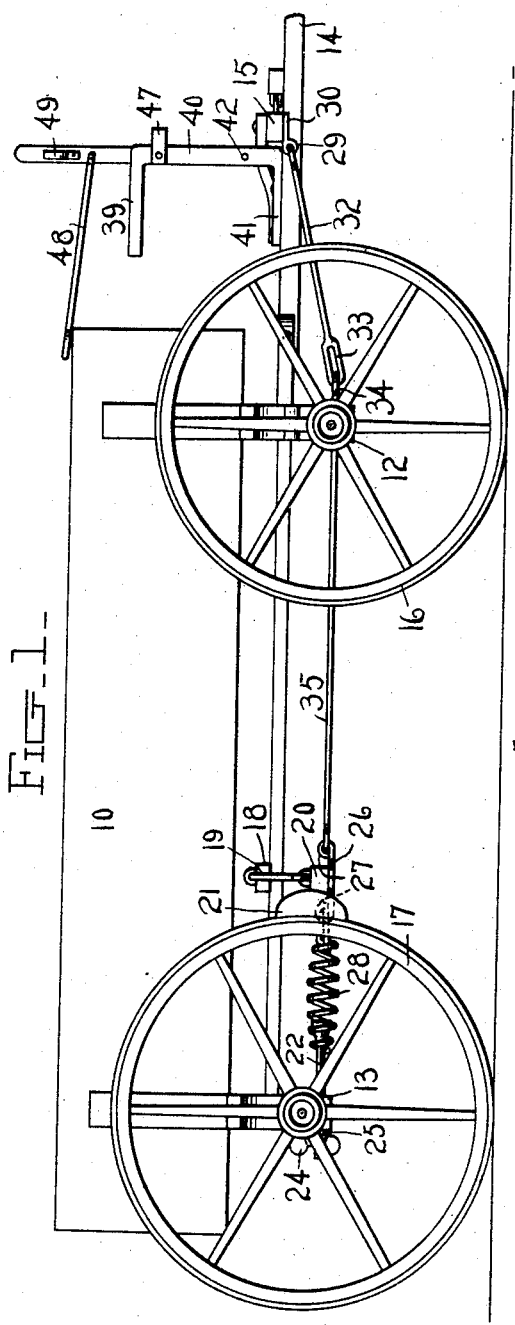
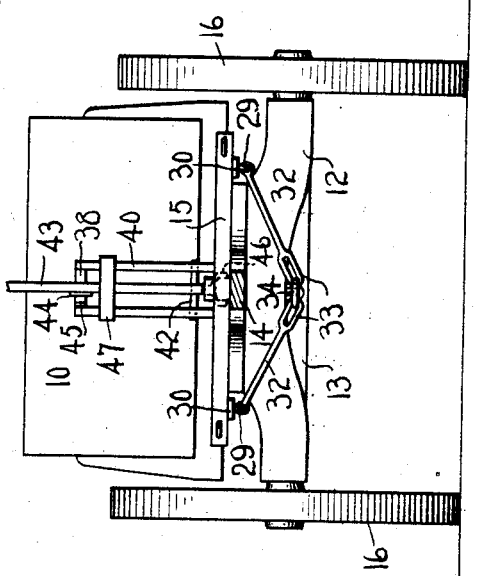
Witnesses
L. B. James
F. G. Smith
Inventor
W. H. Mitchell
By Chandler & Chandler
Attorneys W. H. MITCHELL.
BRAKE.
APPLICATION FILED OCT. 24, 1907.
901,633.
Patented Oct. 20, 1908.
3 SHEETS—SHEET 2.
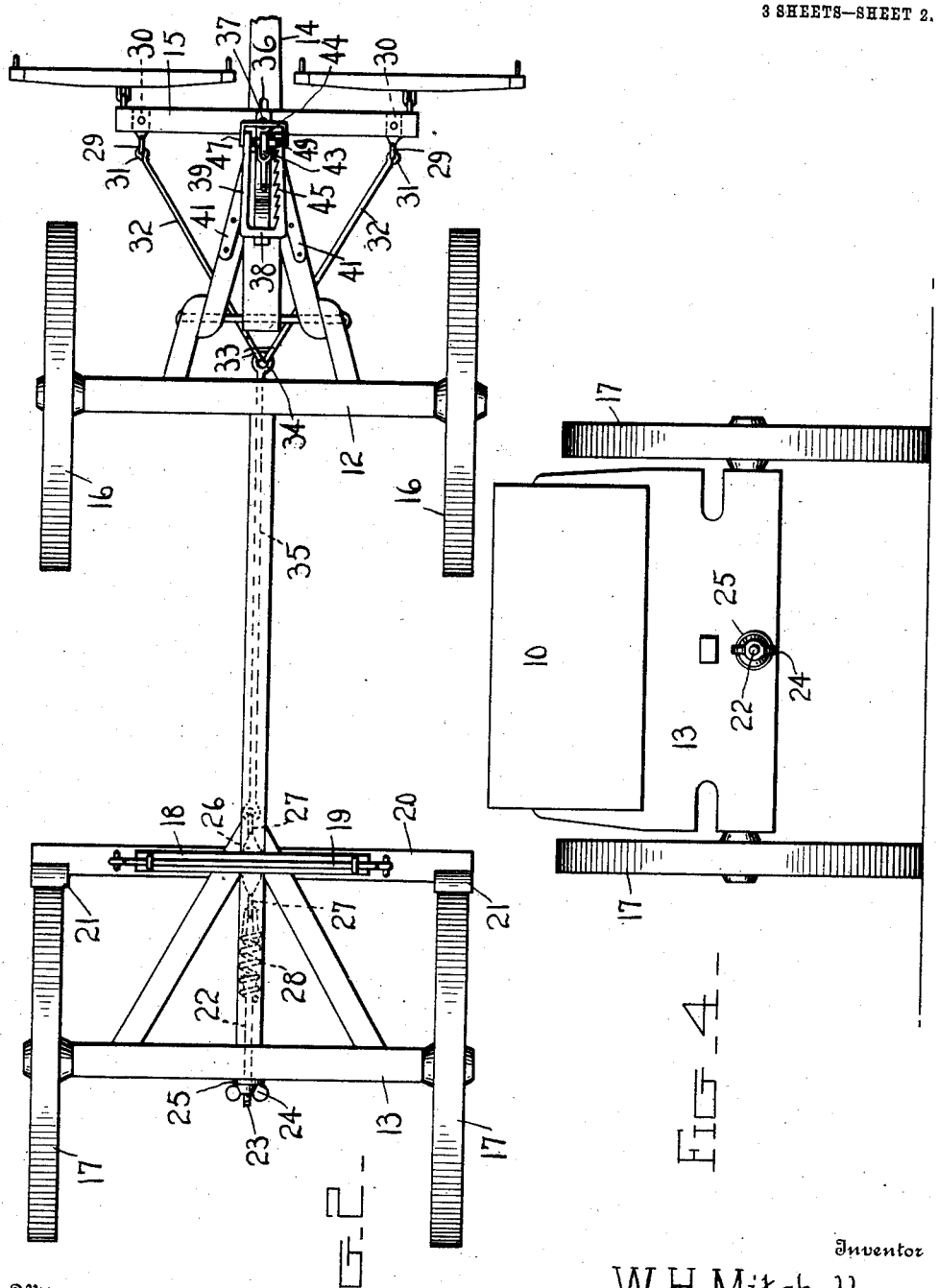

W. H. MITCHELL.
BRAKE.
APPLICATION FILED OCT. 24, 1907.
901,633.
Patented Oct. 20, 1908.
3 SHEETS—SHEET 3.
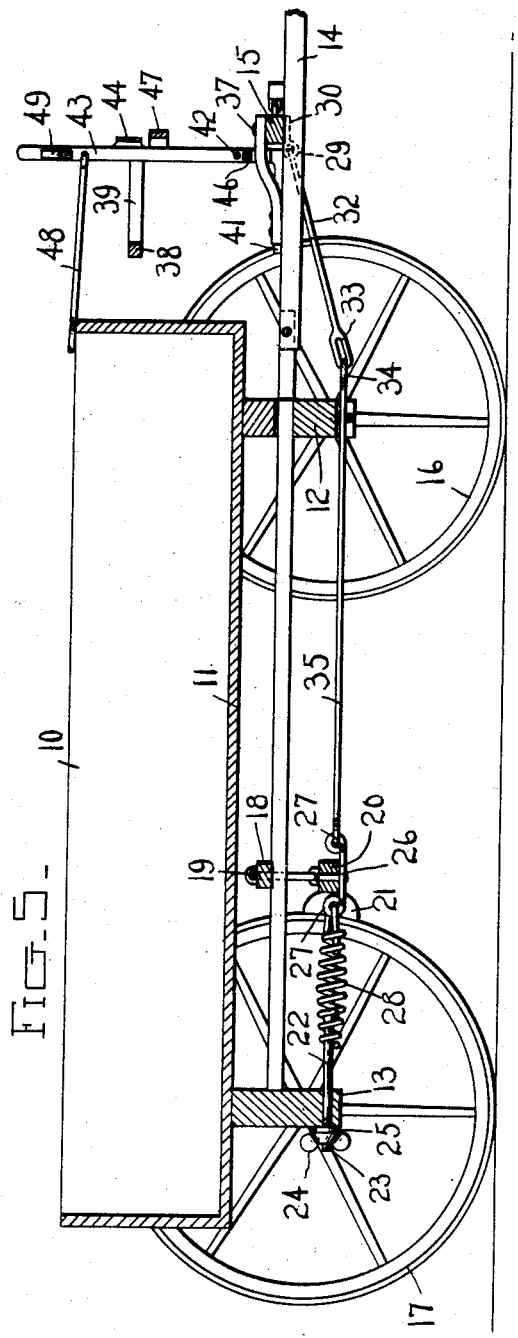
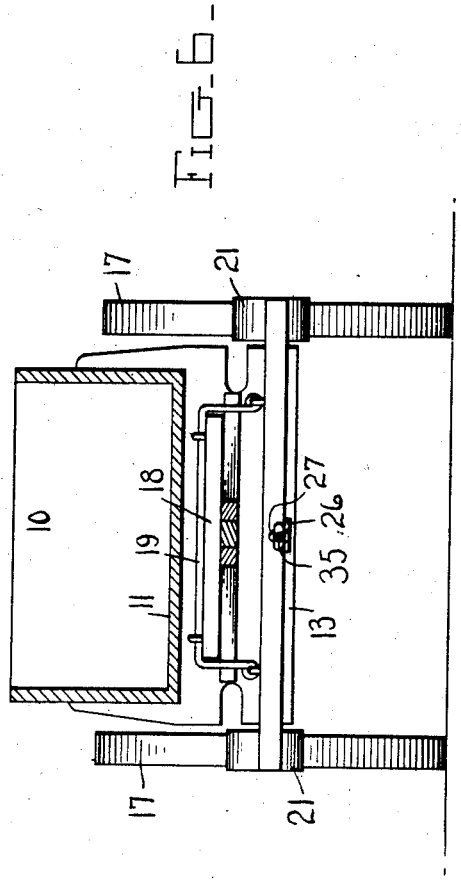
Witnesses
L. B. James
F. G. Smith
Inventor
W. H. Mitchell
By
Attorneys

UNITED STATES PATENT OFFICE.

WILLIAM H. MITCHELL, OF YANCY MILLS, MISSOURI.

BRAKE.

No. 901,633.　　　　Specification of Letters Patent.　　　Patented Oct. 20, 1908.

Application filed October 24, 1907. Serial No. 398,994.

*To all whom it may concern:*

Be it known that I, WILLIAM H. MITCHELL, a citizen of the United States, residing at Yancy Mills, in the county of Phelps, State of Missouri, have invented certain new and useful Improvements in Brakes; and I do hereby declare the following to be a full, clear, and exact description of the invention, such as will enable others skilled in the art to which it appertains to make and use the same.

This invention relates to vehicle brakes and more particularly to that class which are automatic in their action.

In carrying out my invention I employ a brake which will be applied at the time the vehicle is standing still or in going down hill but which will be released automatically while traveling on a level or upgrade. The brake is not confined, however, to these conditions as I have provided means whereby the brake may be released should it be desired to back the wagon or travel fast downgrade, this means being positioned directly in front of the driver and being operable without the necessity of his leaving his seat upon the vehicle.

In the accompanying drawings, Figure 1 is a side elevation of a wagon showing the application of my brake thereto, Fig. 2 is a top plan view, the wagon bed being broken away to more clearly show the brake elements, Fig. 3 is a front elevation of the wagon, Fig. 4 is a rear elevation, Fig. 5 is a vertical longitudinal sectional view through the wagon, and, Fig. 6 is a vertical transverse sectional view taken directly in advance of the brake beam.

In the drawings there is shown a wagon box 10 including the usual bed 11, front and rear axles 12 and 13 respectively, tongue 14, and double-tree 15. The front and rear axles 12 and 13 carry respectively wheels 16 and 17. A cleat 18 is secured upon the rear hounds of the bed 11 of the wagon box and mounted for rocking movement upon this cleat is the usual brake beam hanger 19 which loosely supports a brake beam 20 provided with brake shoes 21 for contact with the wheels 17, it being understood that the brake beam has a forward and rearward oscillatory movement. A rod 22 is engaged through the rear axle 13 and has its rear end projecting rearwardly beyond the same and threaded as indicated by the numeral 23 for the engagement thereon of an adjusting nut 24 preferably of the hand type, this nut bearing against a washer 25 interposed between the said axle and the nut.

Swiveled upon the underside of the brake beam 20 is a plate 26 which extends in a direction longitudinally of the wagon bed and is provided at each of its ends with an upwardly curved hook 27. Connected with the hook 27 at the rear end of the plate is one end of a spring 28, this spring being connected at its opposite or rear end to the forward end of the rod 22. From the above it will be understood that the spring 28 exerts a tension which serves to normally hold the brake beam 20 at the rearward limit of its movement and consequently that the brake shoes 21 will contact with the wheels 17 and that the tension of the spring may be adjusted by turning the nut 24. Hooks 29 are secured by means of attaching portions 30 to the double-tree 15 and engaged with these hooks are the eye ends 31 of rods 32 which extend rearwardly and toward each other and are provided at their rear ends with elongated eyes 33 which are engaged with an eye 34 formed at the forward end of a rod 35. This rod 35 extends rearwardly in a line with the perch pole or reach of the vehicle and is engaged at its rear end with the hook 27 at the forward end of the plate 26 it being understood that by reason of the fact that the eyes 33 are elongated, a certain laxity of movement will be insured.

Adjacent its rear end the tongue 14 is slotted as at 36 and through the slot and the double-tree 15 is passed the pivot bolt 37 for the said double-tree, it being understood that by reason of this construction the double-tree may have a backward and forward movement upon the tongue.

From the foregoing description of my invention it will be observed that normally the brakes are set but as soon as a pull is exerted upon the double-tree in a forward direction the brakes will be released provided the pull is sufficient to overcome the tension of the spring 28. The construction described above, however, is not suitable, by itself, to all conditions as without some means for holding the brake released, the wagon could not be backed. I have devised such means however, and the same comprises a bracket comprising a bar which is bent upon itself substantially at its middle as indicated by the numeral 38 to form spaced portions 39 which are turned to extend downwardly as at 40 and thence laterally and rearwardly as at 41 to form attaching portions by means of which the bracket may be secured upon the forward hounds of the vehicle. Pivoted as at 42 between the portions 40 of the bracket at their lower ends is the lower end of a lever 43 which is provided with an offset lip 44 which coöperates with a plurality of rack teeth 45 formed upon the inner edge of one of the portions 39 of the bracket. At its lower end this lever is bifurcated as indicated at 46 to straddle the tongue 14 rearwardly of the double-tree 15 thereon and it will be understood that should it be desired to lock the brake in released position, the upper end of the lever may be swung rearwardly to cause its forward end to move forwardly and move the double-tree in the opposite direction and release the brake, the lever being in the meantime engaged with the proper rack tooth. A band 47 is riveted or otherwise secured at its ends to the vertical portions 40 of the bracket and is bowed forwardly and lined with leather, cloth, or any other suitable material, it being understood that this band serves to limit the forward movement of the lever whereas the rearward movement of the lever is limited by the portion 38 of the bracket. A rod 48 is pivoted at its forward end to the lever and extends rearwardly and over the dash-board of the vehicle and is provided at its rear end with a hand loop or hold whereby the upper end of the lever may be swung rearwardly as above stated. Secured upon the lever is a conventional form of rein support 49.

What is claimed, is—

1. The combination, in a vehicle brake, with a rear axle, and a brake beam, a spring connected to the brake beam for moving it in the direction of the rear axle, a tongue, and a double-tree mounted for backward and forward sliding movement upon the tongue, of a bracket of inverted U-shaped form secured at the lower ends of its arms to the tongue, a lever pivoted between the arms of the bracket in a plane above the double-tree, the lower end of the lever being in engagement with the rear edge of the double-tree, connection between the double-tree and the brake beam, the upper end of the bracket being turned to extend rearwardly and having one of its arms formed throughout its rearwardly extended portion with rack teeth, and a lip formed upon the lever for engagement with said rack teeth interchangeably.

2. The combination with a vehicle including a rear axle, an oscillatory brake beam, a tongue, and a double-tree mounted for backward and forward sliding movement upon the tongue, of a rod adjustably engaged through the rear axle, a plate swiveled upon the brake beam and having its ends hooked, a spring secured at one of its ends to the forward end of the rod and at its opposite end to the rear hooked end of the plate, a rod connected at its rear end to the forward hooked end of the plate and extending forwardly of the vehicle, rods loosely connected at their forward ends to the double-tree and at their rear ends loosely with the forward end of the last mentioned rod, a bracket mounted at the forward end of the vehicle and including a rack portion, a lever pivoted in the bracket and having its lower end bifurcated to straddle the tongue and to bear against the double-tree, and a rod connected to the lever adjacent the upper end thereof and provided at its rear end with a hand grip.

In testimony whereof, I affix my signature, in presence of two witnesses.

WILLIAM H. MITCHELL.

Witnesses:
W. C. RICHARDS,
H. A. BUEHLER.